United States Patent [19]

Rabin et al.

[11] Patent Number: 5,677,989

[45] Date of Patent: Oct. 14, 1997

[54] SPEAKER VERIFICATION SYSTEM AND PROCESS

[75] Inventors: Michael D. Rabin, Manalapan; Max S. Schoeffler, Old Bridge, both of N.J.

[73] Assignee: Lucent Technologies Inc., Murray Hill, N.J.

[21] Appl. No.: 56,044

[22] Filed: Apr. 30, 1993

[51] Int. Cl.$^6$ ..................................................... G10L 9/08
[52] U.S. Cl. ........................................ 395/2.55; 395/2.82
[58] Field of Search ................................ 381/42; 395/2, 395/2.12, 2.55, 2.59, 2.82, 2.14

[56] References Cited

U.S. PATENT DOCUMENTS

| | | | |
|---|---|---|---|
| 4,532,508 | 7/1985 | Ruell | 340/825.34 |
| 4,653,097 | 3/1987 | Watanabe et al. | 395/2.55 |
| 4,720,863 | 1/1988 | Li et al. | 395/2.55 |
| 4,757,534 | 7/1988 | Matyas et al. | 380/0.25 |
| 4,837,830 | 6/1989 | Wrench, Jr. et al. | 395/2.55 |
| 4,993,068 | 2/1991 | Piosenka et al. | 380/23 |
| 5,054,083 | 10/1991 | Naik et al. | 381/42 |
| 5,167,004 | 11/1992 | Netsch et al. | 395/2 |
| 5,392,357 | 2/1995 | Bulfer et al. | 380/33 |

FOREIGN PATENT DOCUMENTS

| | | |
|---|---|---|
| 0 121 222 | 10/1984 | European Pat. Off. . |
| 0 454 363 | 10/1991 | European Pat. Off. . |

OTHER PUBLICATIONS

A Voice Password System for Access Security, AT&T Technical Journal, No. 5, 1986, pp. 68–74.

G. R. Doddington, "Speaker Recognition—Identifying People by their Voices" Proceedings of the IEEE, Nov. 1985, pp. 1651–1664.

A. E. Rosenberg, et al. "Sub–Word Unit Talker Verification Using Hidden Markov Models" 1990 International Conference on Acoustics, Speech and Signal Procession, Apr. 3–6 1990, pp. 269–272.

G. Meyer, "Cryptography—A State of the Art Review," VLSI and Computer Peripherals, May 1989, pp. 4–150 –4–154.

*Primary Examiner*—Allen R. MacDonald
*Assistant Examiner*—Susan Wieland
*Attorney, Agent, or Firm*—B. H. Freedman; G. C. Ranieri

[57] ABSTRACT

An individual's speech sample, obtained for the purpose of speaker verification, is used to create a "protected" model of the speech. The protected model, which is stored in a database in association with a personal identifier for that individual, is arranged so that the characteristics of the individual's speech cannot be ascertained from the protected model, without access to an encryption key or other secured information stored in the system.

6 Claims, 6 Drawing Sheets

SPEAKER VERIFICATION SYSTEM AND PROCESS

FIELD OF THE INVENTION

This invention relates to a speaker verification system and process for confirming the claimed identity of an individual using stored speech samples, and, in particular, to a system and process used to generate and store speech samples and to retrieve the speech samples so that they are secured against abuse for later use in the speaker verification process.

BACKGROUND OF THE INVENTION

Speaker verification processes and systems are used to confirm the identity of an individual for such purposes as controlling or limiting access to a resource. In this context, a resource could be the telephone network, a bank account, or a computer. Generally speaking, certain characteristics of an individual's speech sample, also called a speaker utterance, are used to form a template or model, which is stored. When a person claiming to be that individual (hereinafter, the "claimant") seeks access to the resource, the claimant is asked to provide a speech sample. The characteristics of the speech sample offered by the claimant are compared with the stored template or model, and the identify is confirmed only upon a successful match.

Users of speaker verification systems have expressed concern that stored speech samples can be misappropriated and/or misused, with dire consequences. This is because a person who's speech sample is compromised cannot "discard" or change their individual speech characteristics and provide a new sample, in the same manner as a personal identification number (PIN). When a PIN is compromised, a new one can be assigned to the person, and the old one canceled or invalidated. However, if a thief obtains a speech sample, or a speech template or model for a particular person, the thief in essence can "become" that person, at least for the purpose of identifying himself to a speech verification system.

SUMMARY OF THE INVENTION

In accordance with the present invention, an individual's speech sample, obtained for the purpose of speaker verification, is used to create a "protected" model of the speech. The protected model, which is stored in a database in association with a personal identifier for that individual, is arranged so that the characteristics of the individual's speech cannot be ascertained from the protected model, without access to a key or other information stored in the system.

When a request is received to verify the identity of a claimant, i.e., a person claiming to be a particular individual, a sample of the claimant's speech is obtained, and the protected model associated with the personal identifier provided by the claimant is retrieved. The protected model is processed using the stored key, or the speech sample is processed using the stored information, so that a comparison can then be performed to determine if the retrieved model corresponds to the claimant's speech sample.

In one embodiment of the invention, an individual's speech sample is used to build a speech model or template in a conventional manner, but the model is then encrypted using an encryption key known only to the system to create a protected model that is stored in association with that individual's personal identifier. When a person claiming to be that individual seeks access to a resource, the claimant's offered speech sample is compared with a decrypted version of the protected model, and the identity is verified only in the event of a successful match. Since the speech model is stored in encrypted form, and a key is needed for decryption, misappropriation will not benefit a thief.

In another embodiment of the invention, an individual's speech sample is subjected to a transformation in a transformation processor, the output of which is applied to a model generator in order to create a protected model that is stored in association with that individual's personal identifier. When a claimant seeks identity verification, the claimant's offered speech sample is also transformed using the same transformation, and the result is compared with the stored protected model retrieved using the personal identifier provided by the claimant. Verification is provided only in the event of a successful match. Since the model that is stored has been subjected to a transformation, and the same transformation is used on the claimant's speech sample, misappropriation will again not benefit an unauthorized individual. Furthermore, even if the protected model is stolen, the harm can be remedied. The transformation can be changed, and the individual can provide another speech sample to regenerate another protected model. The stolen model will thereafter become ineffective. Preferably, the transformation is "irreversible", so that an individual's speech sample cannot be recreated from a stolen protected model.

BRIEF DESCRIPTION OF THE DRAWINGS

The present invention will be more fully appreciated by consideration of the following detailed description, which should be read in light of the accompanying drawings in which.

DETAILED DESCRIPTION

Figure 1:
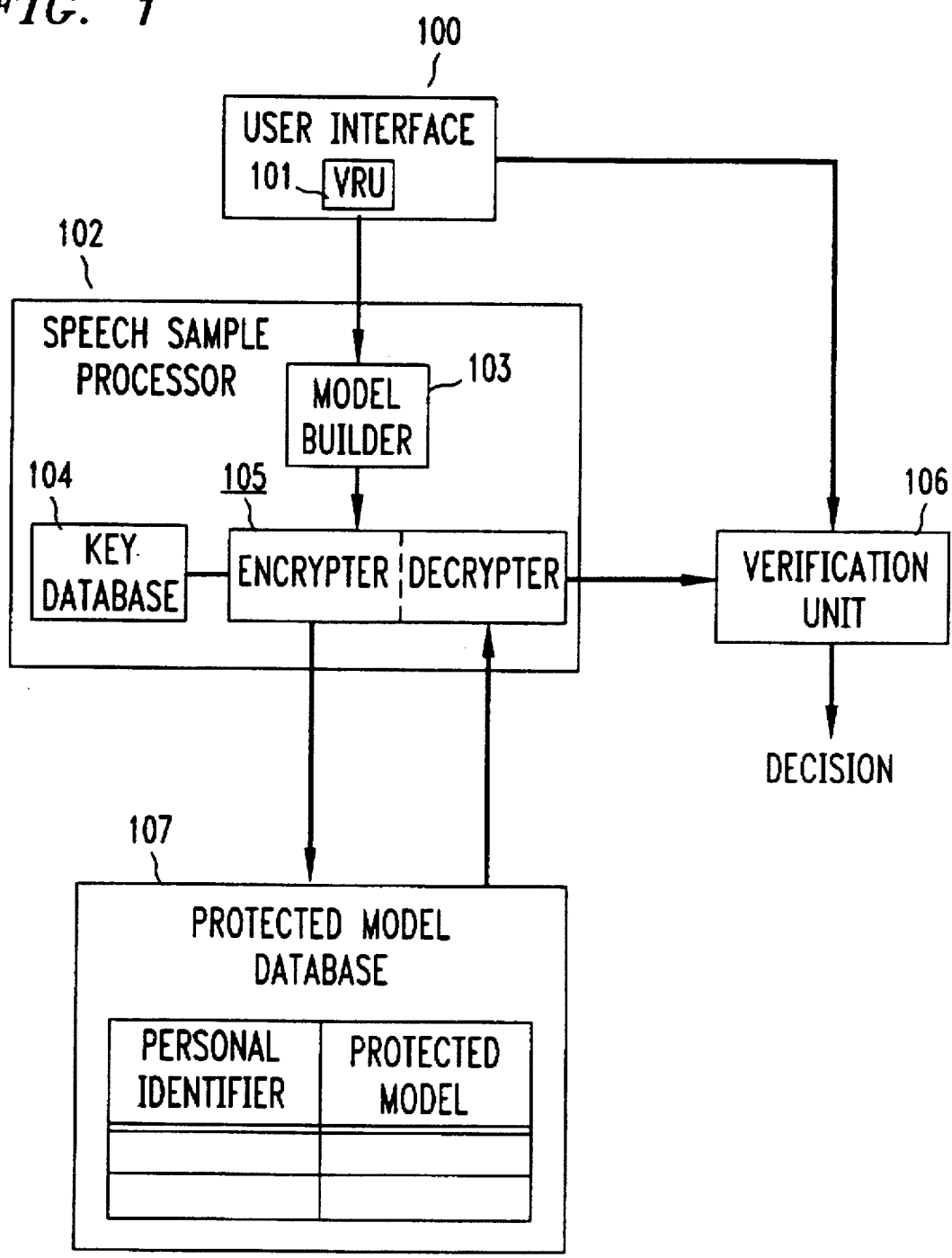
FIGS. 1 and 2 are a block diagrams of two embodiments of a speaker verification system arranged in accordance with the principles of the present invention, to create and store a protected speech model and thereafter use the model to control access to a resource; the embodiment of FIG. 1 uses encryption/decryption, and the embodiment of FIG. 2 uses a transformation.

Referring first to FIG. 1, there is shown a block diagram of a first embodiment of a speaker verification system arranged in accordance with the principles of the present invention, to create and store protected speech models for different individuals and thereafter use these models to verify the identity of a person claiming to be a particular one of those individuals. Broadly speaking, the system of FIG. 1 performs two main processes, referred to below as the "subscription" process and the "access" process. The "subscription" process is performed once, for example when a particular individual subscribes or registers in order to thereafter enable speaker verification. Subscription can occur for the purpose of enabling an individual to obtain permission to make credit card purchases, or gain access to a remote computer, or to initiate long distance telephone calls. During the subscription process, the individual provides a speech sample and a personal identifier is assigned to the individual. Later, during the "access" process, the identity of a person (claimant) claiming to be a particular individual is verified. This process can be performed, for example, each time a person seeks access to a resource, e.g., to make a telephone call or a credit card purchase, to use a remote computer, or to simply convince another person of his/her identity.

The system of FIG. 1 includes a user interface 100 which is used both during the subscription and access processes. However, it is to be noted here that separate user interfaces can be provided for use during each process. User interface 100 contains an interactive voice response unit (VRU) 101 such as the Conversant (R) Voice Response System available from AT&T, that has the capability of (a) playing announcements, (b) collecting information input by individuals, including both speech samples as well as other information entered, for example, via a touch-tone key pad, and (c) performing preprogrammed logical operations depending upon the responses received. During the subscription process, VRU 101 prompts the individual for a speech sample, and a personal identifier used later in the access process can be assigned to that individual at that point. During the access process, VRU 101 prompts the claimant for a personal identifier and for a speech sample.

The information collected by the user interface 100 is applied to a speech sample processor 102, which is arranged to process speech samples collected from individuals during the subscription process and generate corresponding protected speech models. During the access process, processor 102 also decrypts protected speech models, as described more fully below.

With respect to the building of a protected speech model, processor 102 includes a speech model builder 103 which is arranged to accept and process raw speech data collected by VRU 101 so as to derive a unique "voiceprint" or speech model that describes the characteristics of the individual's speech in a way sufficient to differentiate that individual's speech from that of other persons. This speech model is supplied to the encrypter portion of an encryption unit 105, which also includes a decrypter portion. In encryption unit 105, encryption and decryption may be performed in accordance with well known data encryption standard (DES) techniques or other means, using a key stored in an associated key database 104. Different keys can be assigned to different individuals, based for example, upon the personal identifier assigned to each individual.

The output of speech sample processor 102 is applied to and stored in a database 107, which may be a conventional database memory arranged to store protected models and the associated personal identifiers. When database 107 is queried during the access process, using a personal identifier as a look-up key, the associated protected speech model is retrieved.

During the access process, as described more fully below, a determination is made using speaker verification, as to whether a person claiming to be a particular individual is, in fact, that individual. For this purpose, a speaker verification unit 106 is arranged to determine if there is a match between a speech sample provided by the claimant and the decrypted version of the protected speech model for the individual that the claimant claims to be. If the result of the comparison performed by verification unit 106 indicates a match, a signal may be generated indicating a positive speaker verification. This signal may be used to authorize access to a resource such as the telephone network or for other purposes.

Figure 2:
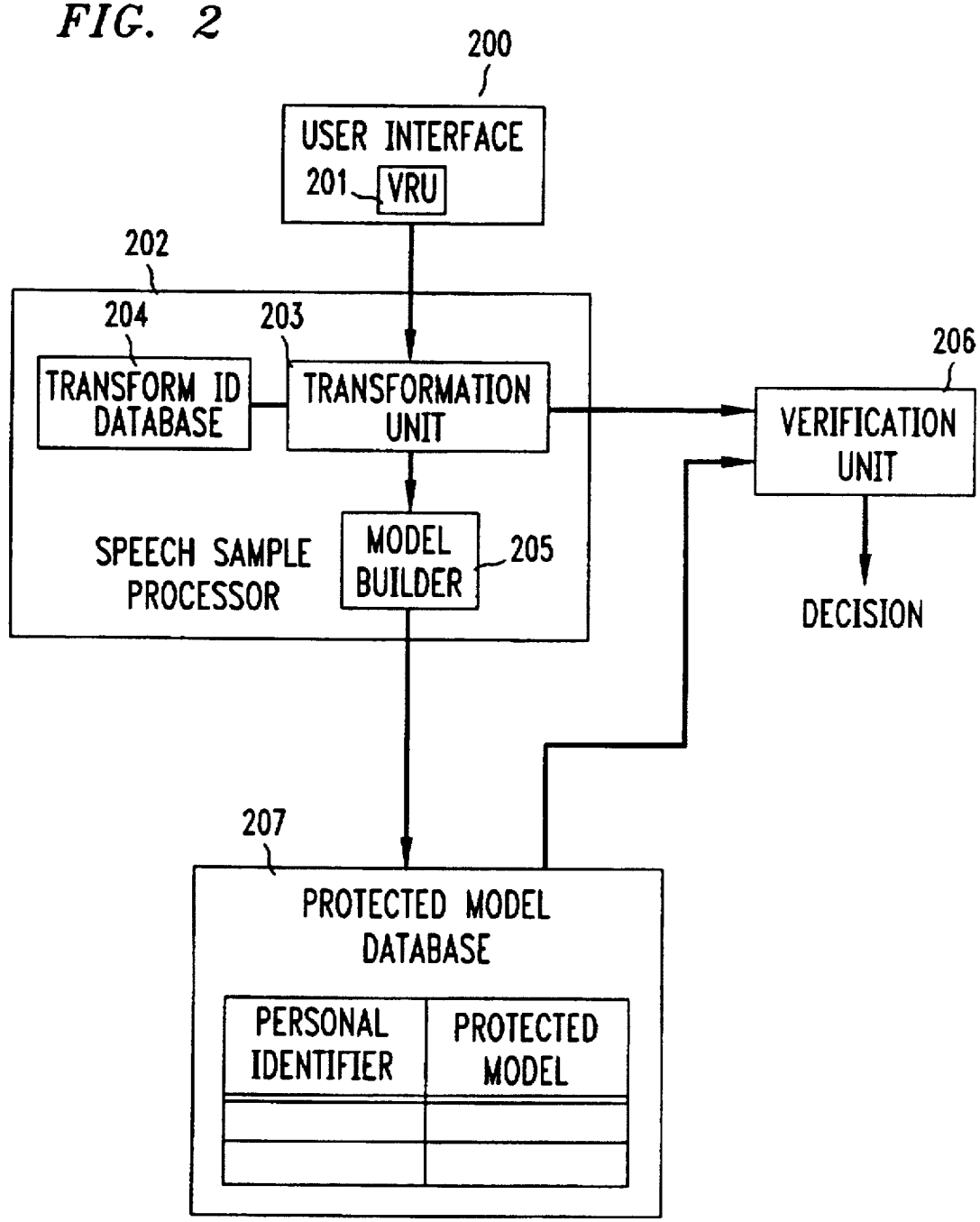

In a second embodiment of our invention, shown in FIG. 2, user interface 200, VRU 201, database 207, and verification unit 206 correspond to similar elements in FIG. 1. In this embodiment, speech sample processor 202 includes a transformation unit 203, which is arranged to generate a transformed version of the speech sample obtained by VRU 201. The transformation may be accomplished using analog or digital techniques, and is preferably arranged so that after a speech sample has been transformed, the original speech sample cannot be recreated from the transformed version. Various transformations can be devised by those skilled in the art to accomplish such transformation. In this embodiment of the invention, verification unit 206 is arranged to determine if there is a match between a transformed speech sample from a claimant purporting to be a specific individual and the stored transformed speech sample (protected model) for that individual.

Figure 3:
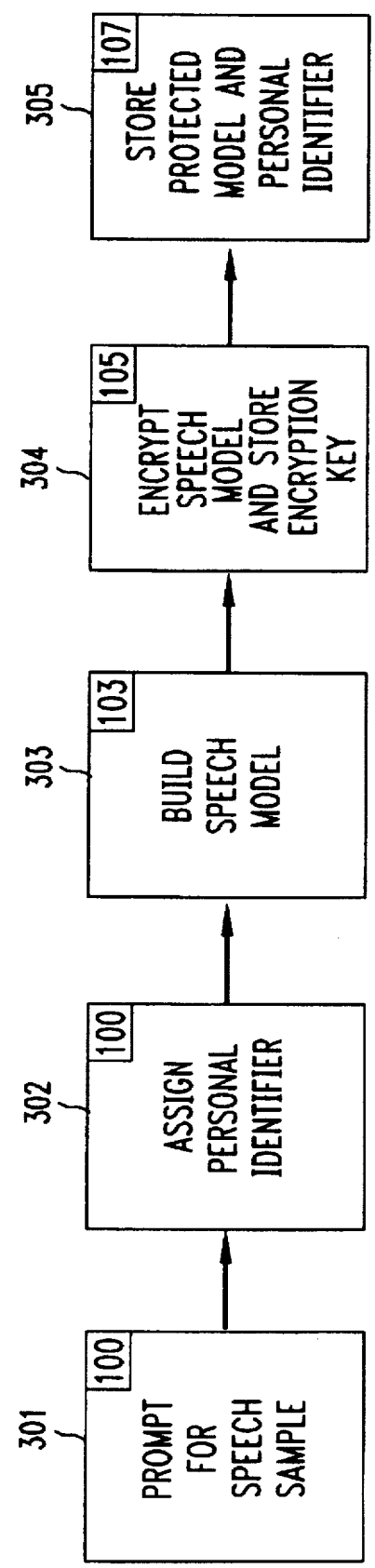
FIGS. 3 and 4 are flow diagrams showing the steps followed in the subscription and access processes, respectively, performed in accordance with the first embodiment of the present invention shown in FIG. 1.
Figure 4:
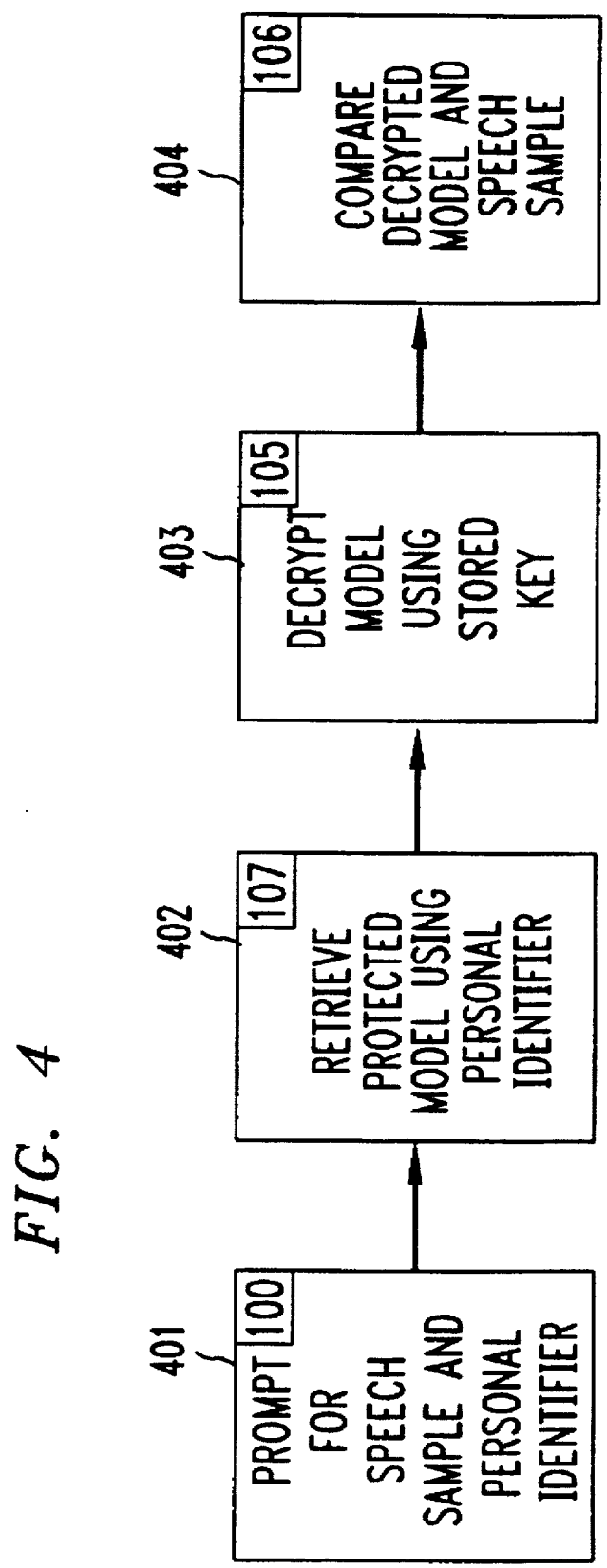

Referring now to FIGS. 3 and 4, there is shown flow diagrams of the steps followed in the "subscription" and "access" processes, respectively, performed in accordance with the first embodiment of the speaker verification process of the present invention illustrated in FIG. 1, to create and store a protected speech model and thereafter use the model to verify the identity of a person claiming to be a particular individual. In FIGS. 3 and 4, the element of FIG. 1 performing a particular step is indicated in the upper right corner of the rectangle describing the step.

The subscription process begins in step 301, in which the individual interacts with user interface 100, either remotely via a telephone line, or locally, such as by using a microphone connected to the system. In this step, VRU 101 prompts the individual for one or more representative speech samples. A sample could be obtained by asking the individual to say a specific phrase. Alternatively, for more sophisticated applications in which a challenge and response access control approach is used, VRU 101 can be arranged to request the individual to provide, in the individual's voice, the maiden names of the individual's parents, the social security number of the individual and his or her spouse, samples of the digits zero through nine, and other similar information.

Next, in step 302, a personal identifier, e.g., a PIN, unique to that individual or, alternatively, shared by a small group of individuals such as a family, is assigned.

The speech sample obtained in step 301 is applied to speech sample processor 102, so that the raw speech sample can be used to generate a "protected model" of that speech. In this embodiment of the invention, the protected model is generated in two steps, steps 303 and 304. First, in step 303, the speech sample is processed in model builder 103 to generate what can be thought of as a unique "voiceprint" that describes the characteristics of the customer's speech and differentiates the speech patterns of one individual from those of other persons. Numerous feature extraction algorithms have been proposed, and can be used in this step, such as described, for example, in Doddington, G. R., "Speaker Recognition, Identifying People by their Voices," Proceedings IEEE, Vol. 73, No. 11, November 1985, pp 1651–1664; Rosenberg, A. E., Lee, C., Soong, F. K. "Sub-word Unit Talker Verification Using Hidden Markov Models," International Conference of Acoustic Speech and Signal Processing, 1990, p. 269.

The speech model generated in step 303 is applied to encryption unit 105 in step 304, in order to encrypt the model and thereby generate the protected speech model which is resistant to theft and which cannot be used without an encryption key stored in key database 104. Encryption may be performed in accordance with the data encryption standard (DES) techniques, or any other suitable technique. The protected speech model is stored in database 107 in step 305, and is associated with the personal identifier (assigned in step 302), which serves as a look-up key when database 107 is subsequently queried during the access process.

Turning now to FIG. 4, when a person claiming to be a previously subscribed individual requests speaker verification using the system of FIG. 1, the claimant provides his or her personal identifier and a speech sample to user interface 100 in step 401. In step 402, the personal identifier is used to locate and retrieve the protected speech model for the individual that the claimant claims to be, from database 107, and that protected speech model is then applied to encryption unit 105 for decryption in step 403. The appropriate key, based upon the personal identifier, is obtained from key database 104, and used in the decryption process. The output of encryption unit 105, which thus represents the original speech model obtained from the individual that previously provided a voice sample, is applied, in step 404, to verification unit 106, together with the speech sample offered by the claimant. Verification unit 106 compares the speech sample and the decrypted model to determine if there is a match. If the result of the comparison is positive, indicating a close match, the claimant is determined to be the individual that previously performed the subscription process. On the other hand, if the result of the comparison is negative, verification is denied.

Figure 5:
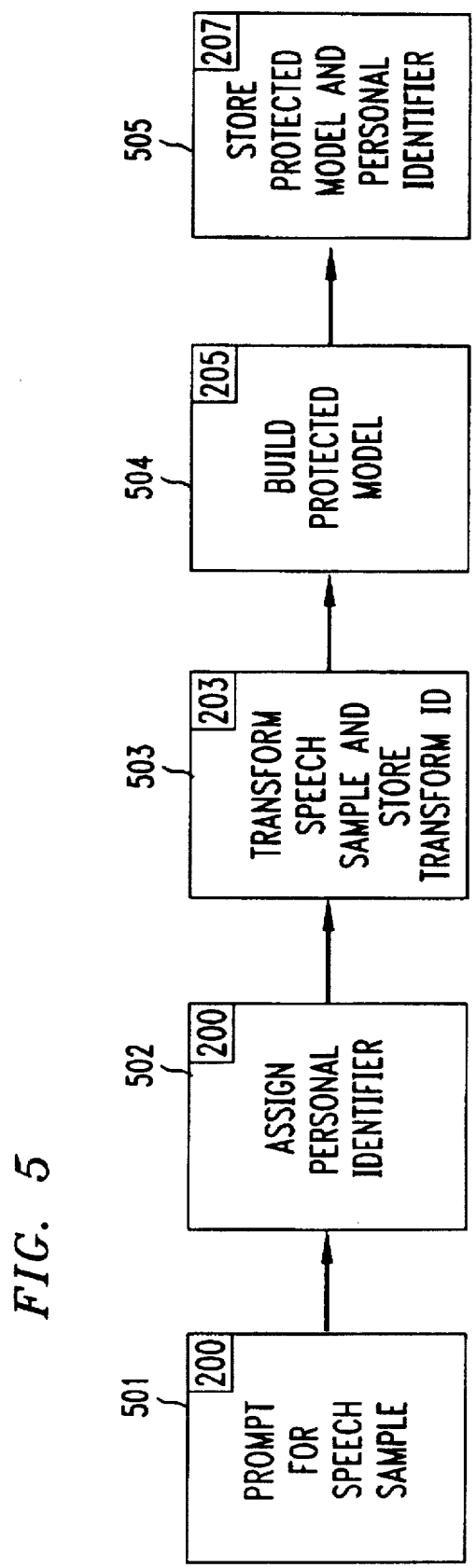
FIGS. 5 and 6 are flow diagrams showing the steps followed in the subscription and access processes, respectively, performed in accordance with the second embodiment of the speaker verification process of the present invention shown in FIG. 2.
Figure 6:
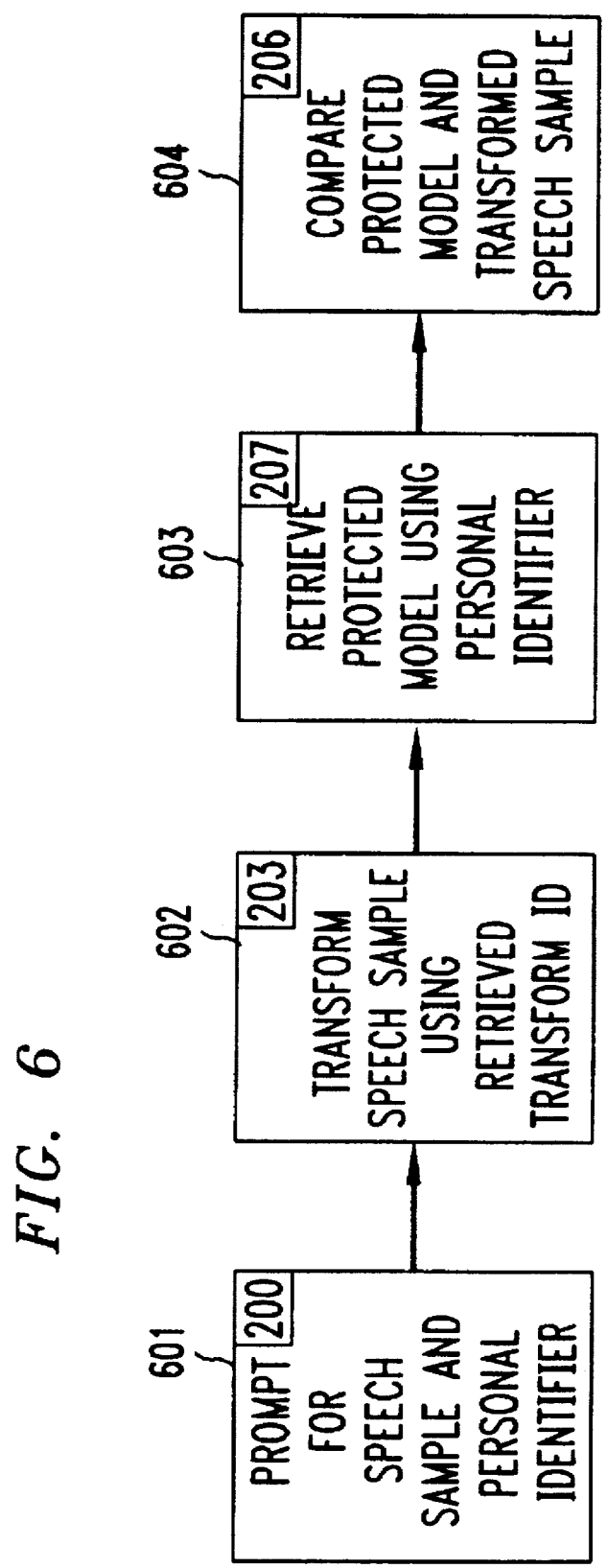

The steps performed in the subscription and access processes for the embodiment of the present invention illustrated in FIG. 2, are shown in FIGS. 5 and 6, respectively. In the access process of FIG. 5, the individual's representative speech sample is obtained in step 501 in a manner similar to that described above in connection with step 301, and a personal identifier is assigned in step 502. Next, however, the speech sample is applied, in step 503, to an analog or digital transformation unit (203 in FIG. 2) in such a manner as to generate a version of the speech sample which cannot be used by an unauthorized person to recreate the individual's speech sample. For example, a simple time slice of the endpointed acoustic signal can be taken, and the slices rearranged according to a predefined, secure sequence. The transformation is preferably such that it is irreversible: once me speech sample has been processed, the transformed version cannot be again processed to obtain the speech sample. Information associating a particular transformation with a particular individual based upon that individual's personal identifier, is stored in transformation ID database 204.

In step 504, the transformed speech sample is applied to model builder 205, to extract important characteristics used to build a model of the individual's speech to be used in the access process. The protected model is stored in database 207 in step 505, together with the personal identifier assigned in step 502, which serves as a look-up key when the database is queried during the access process. Note that an unauthorized person who obtains stored information from database 107 can not use it to imitate the individual who provided the sample, because the speech sample has previously been transformed and does not resemble the individual's actual speech.

During the access process of FIG. 6, the person claiming to be an authorized individual provides a speech sample together with a personal identifier in step 601. The speech sample is applied to transformation unit 203 in step 602, and the output is applied to verification unit 206. The personal identifier provided by the claimant is used to extract a protected speech model from database 207 in step 603, and this too is applied to verification unit 206. Then, in step 604, the claimant's transformed speech sample and the retrieved protected model are compared, to determine if there is a match. If the result of the comparison is positive, indicating a close match, the person requesting speaker verification is determined to be the individual that previously performed the subscription process. On the other hand, if the result of the comparison is negative, the claimant's identify has not been confirmed.

Various modifications and adaptations can be made to the present invention. For example, separate user interfaces can be provided to the system for use during the access process and the subscription process. Note too that an adaptive learning technique may be devised by persons skilled in the art, wherein speech models constructed and stored during the subscription process are updated during the access process, to accommodate changing voice characteristics. In addition, although the embodiments of the invention described herein include reference to a personal account identifier which serves to distinguish among multiple users of the system and/or method, it should be apparent to a person skilled in the art that the invention can be adapted for use in a single user system such as a system arranged to verify the identity of a person carrying a "smart card" which itself contains a speech sample obtained from that person. In such a system, the smart card itself is the database which stores the protected model, and neither a separate database (107 or 207) nor a personal identifier is required.

We claim:

1. A method for confirming the claimed identity of an individual, said individual having a personal identifier, said method comprising the steps of:

receiving a sample of the individual's speech;

creating a protected model of said speech using said sample by transforming said sample using a transformation method such that characteristics of said individual's speech cannot be ascertained by accessing said protected speech model, wherein the transformation method is based on at least the personal identifier;

storing said protected model in association with said personal identifier;

in response to a request for identity confirmation, receiving a sample of a claimant's speech and a personal identifier provided by said claimant;

retrieving the protected model associated with said personal identifier received from said claimant;

transforming said claimant's speech sample with the same transformation method used in said creating step;

performing a comparison to determine if said retrieved model corresponds to said claimant's transformed speech sample; and confirming the identity of said claimant only if said comparison indicates a positive match.

2. A method for verifying the claimed identity of an individual, comprising the steps of:

receiving a speech sample from said individual;

generating a protected model of said speech sample by transforming said sample using a transformation method such that characteristics of said individual's speech cannot be recreated by accessing said protected model alone, wherein the transformation method is based on at least data particular to the individual;

storing said protected model;

receiving a request to verify the identity of a claimant claiming to be said individual;

prompting said claimant to input a sample of said claimant's speech;

retrieving said protected model;

processing said claimant's speech sample with the same transformation method used in said generating step to enable direct comparison between said claimant's speech sample and said retrieved protected model; and verifying the identity of said claimant only if said comparing step indicates a positive match.

3. A method of speaker verification comprising the steps of:

transforming a speech sample received from a user to be verified using a transformation method to generate a protected model that is secured against unauthorized use, wherein the transformation method is based on at least data particular to the user;

processing a speech sample received from a claimant claiming to be said user with said transformation method so that said claimant's speech sample can be compared with said protected model received from said user; and verifying that said claimant is said user if said protected model matches said claimant's processed speech sample.

4. A system for confirming the claimed identity of an individual using speech verification, said individual having a personal identifier, said system comprising:

receiving means for receiving an individual's speech sample of said individual's speech, said individual's personal identifier, a claimant's speech sample of a claimant's speech, and a personal identifier from said claimant;

means for creating a protected model of said individual's speech using a transformation method that transforms said individual's speech sample such that the characteristics of said individual's speech cannot be ascertained by accessing said protected model, wherein the transformation method is based on at least the personal identifier;

means for storing said protected model in association with said individual's personal identifier and for retrieving the protected model associated with said personal identifier received from said claimant in response to a request for identity confirmation;

transforming means for transforming said claimant's speech sample with said transformation method; and comparing means for performing a comparison to determine if said retrieved protected model corresponds to said claimant's speech sample, and confirming the identity of said claimant only if said comparison indicates a positive match.

5. Apparatus for verifying the claimed identity of an individual, comprising:

means for generating a protected model of a speech sample received from said individual by transforming said speech sample using a transformation method such that characteristics of said individual's speech cannot be ascertained by accessing said protected model, wherein the transformation method is based on at least data particular to the individual;

means for storing said protected model;

means for receiving a speech sample from a person claiming to be said individual;

means for transforming said claimant's speech sample using said transformation method; and means for comparing said protected model of said individual's transformed speech and said transformed speech sample received from said person.

6. Apparatus for providing speaker verification wherein a stored speech sample is secured from misappropriation, comprising:

means for receiving a speech sample from a user of said apparatus;

means for irreversibly transforming said speech sample using a transformation method to generate a protected speech model which is unique to said user but which cannot be further used for speaker verification without additional information, wherein the transformation method is based on at least data particular to the user;

means for storing said protected speech model for later comparison with a speech sample received from a person claiming to be said user; and means for receiving and transforming a claimant's speech sample using said transformation method.

* * * * *